Nov. 26, 1940.　　　C. L. ARMSTRONG　　　2,222,996

DECOY

Filed March 17, 1939

INVENTOR
C. L. ARMSTRONG
Jesse R. Stone
Lester B. Clark
ATTORNEYS

Patented Nov. 26, 1940

2,222,996

UNITED STATES PATENT OFFICE 2,222,996

DECOY

Charles L. Armstrong, Houston, Tex., assignor of forty per cent to C. A. Oliveros, Houston, Tex.

Application March 17, 1939, Serial No. 262,417

8 Claims. (Cl. 43—3)

The invention relates to a bird decoy which is simple and economical in its construction and which has a substantially flat bottom so that it will not capsize and will retain its shape and configuration indefinitely.

Decoys, as they are generally marketed today require the use of counterbalances and other devices to maintain them in an upright position and are not constructed in a sturdy manner such that they can be readily handled without damage. It is therefore one of the objects of the invention to provide a decoy duck which is sturdy in its construction and which is held together by stitching so that the desired configuration will be maintained.

Another object of the invention is to provide a decoy duck made of two like pieces of fabric which are sewed together to provide the entire body and head of the decoy.

Another object of the invention is to stuff a fabric container with ground cork treated with shellac or other glutinous composition, and while the composition is moist so that it will solidify in the desired shape.

Another object of the invention is to provide stitching extending from opposite sides along the back of the decoy downwardly toward the center and the base thereof so as to pull in the stuffing of the body and give it a natural configuration, and maintain a flat or concave bottom, indefinitely.

Another object of the invention is to provide the eyes of the decoy in such a manner so that as the two eyes are attached they will hold inwardly so as to provide a natural outline of the head including a bulge directly behind the bill.

Another object of the invention is to provide a decoy duck dyed or printed by machine, before assembling. The color design to be dyed or printed on the fabric in exact simulation of the live bird to be attracted and the colors to be sealed in and protected by a waterproofing agent so as to render such coloring effect impervious to water and the elements, thereby creating a decoy that will have a long and useful life that can be produced at a minimum cost.

Another object of the invention is to provide a decoy duck with the center of gravity at the lowest possible point which renders the decoy non-capsizable.

Another object of the invention is to provide a decoy duck that is so light that even in calm weather the decoy will ride at its anchor in a lifelike position and show swimming motion even in the lightest of breezes.

Another object of the invention is to provide a decoy duck with a flat bottom approximately five and one-half (5½) inches wide by twelve (12) inches long, contacting the water surfaces producing great bouyancy with a light draft of approximately three-eighths (⅜) of an inch.

Another object of the invention is to provide a decoy duck with an anchor ring attached to the forward end which secures the decoy to the windward at all times and renders it non-capsizable.

Another object of the invention is to provide a wooden bill for the decoy wherein the bill, of natural shape, is inserted inside of the fabricated covering so that the bill, head and body are all one integral construction inside of the fabric container.

Other and further objects of the invention will be readily apparent when the following description is considered in connection with the accompanying drawing wherein.

Figure 1:
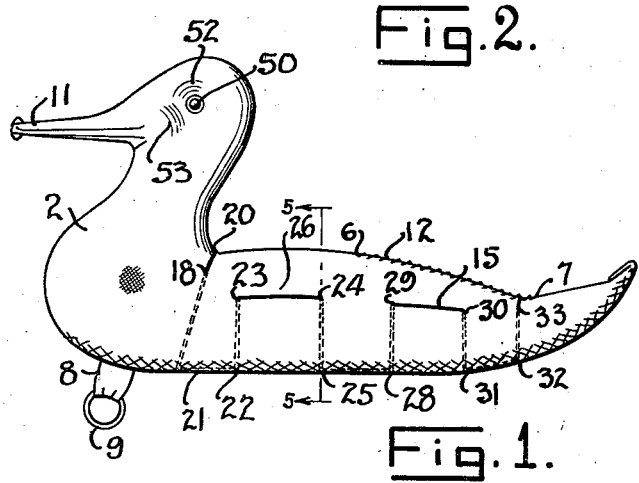
Fig. 1 shows a side elevation of a complete decoy.
Figure 5:
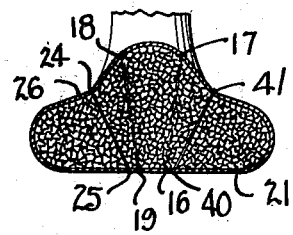
Fig. 5 is a section taken on the line 5—5 of Fig. 1 and looking in the direction of the arrows to illustrate the manner of the stitching.

A decoy is indicated generally at 2 in Fig. 1 and is made up of two like pieces of material 3. This material may be of canvas, Bohemian tick, or other suitable fabric which is cut to the desired outline, it being understood that various types of birds may be simulated by the decoy and that the configuration will be in accordance with the type bird to be simulated. The fabric may be treated, dyed, stamped or painted in strip form and the pieces then cut from the strip so that the decoy need not necessarily be painted after it is assembled. Water proofing may be applied before or after cutting of the fabric.

The two like pieces of material 3 are arranged together and sewed around the outline adjacent the edge, as indicated at 5. It will be noted that there is an open space between the points 6 and 7 where the sewing is omitted. This open space may be provided at any point of the body. This leaves an open space by which the stuffing may be inserted. A tab 8 carrying a ring 9 may be sewed between the pieces of fabric so that after the sewing when the outline is turned inside out then the body will extend outwardly as seen in Fig. 1. This tab is used to attach a light line, such as a fishing line, so as to hold or anchor the duck in the desired location. This tab extends forwardly and downwardly in the direction of the line of pull so as not to hold the decoy in an unnatural position. Thus the decoy will always ride to windward and over the waves in the same manner as a flat board.

After the fabric body has been reversed so that the seam is on the inside, then it is ready for stuffing.

Figure 7:
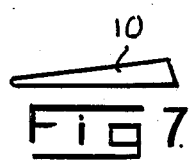
Fig. 7 is a side elevation of the wooden bill which is inserted in the fabric covering.

A stuffing for the lower portion of the body which has been found to be satisfactory is ground cork which is sprayed with shellac or other glutinous substance and stuffed into the body while it is moist. This stuffing is arranged in the proper configuration and allowed to solidify so as to give the body a firmness. This cork may be used throughout the entire body and the head if desired but in many instances it has been found desirable to only stuff the portion approximate the lower half of the body up to the base of the neck with the cork. The wooden bill indicated at 10 in Fig. 7 is inserted into the covering portion 11 which forms the bill of the body. This wooden bill is formed to fit tightly within the stitched portion of the fabric so as to give a very definite outline. The head and breast of the body can now be stuffed with kapok, cotton, or any other light material desired and the remainder of the body stuffed with cork as outlined above. The material is inserted firmly so as to fill the fabric. The open space between the points 6 and 7 is now sewed up with the stitching 12 as seen in Fig. 1.

Figure 2:
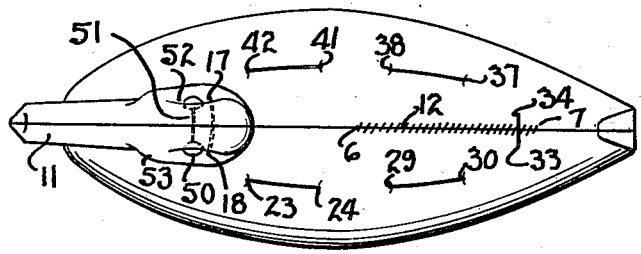
Fig. 2 shows a top plan view looking down on the decoy of Fig. 1.
Figure 3:
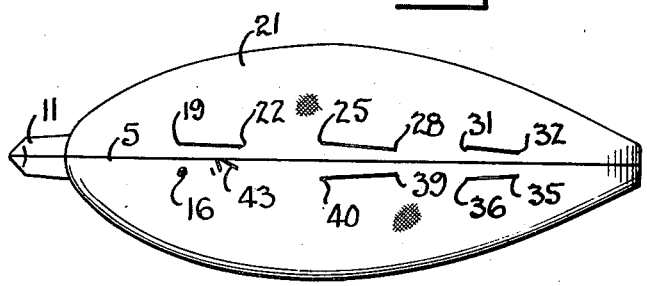
Fig. 3 shows a bottom plan view looking upwardly from the bottom of Fig. 1.
Figure 6:
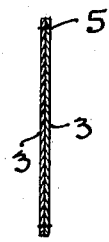
Fig. 6 is a section taken on the line 6—6 of Fig. 4 to illustrate how the two sides are stitched together.
Figure 4:
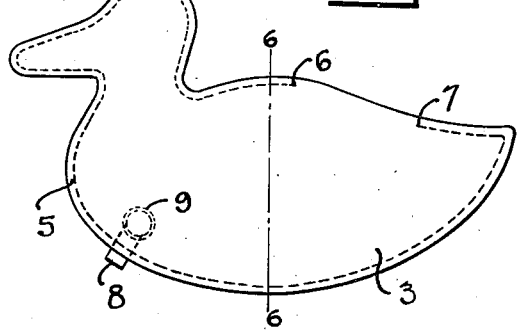
Fig. 4 is an outline of the two pieces of fabric stitched together prior to stuffing.

One of the essential features of the invention is the stitching with a relatively heavy cord such as indicated at 15 in Fig. 1. This stitching is preferably started at the point 16 at the front of the breast or base of the body below the neck as seen in Fig. 3 and the thread extends upwardly to the point 17 as seen in Fig. 2 on the forward upper portion of the back directly behind the neck. The thread is then carried across the back and reenters the body at 18, extending downwardly and inwardly to the breast emerging again at the base 19. When this portion of the thread is pulled down firmly it creates the proper set to the neck portion at 20 so as to hold the body firmly and the neck erect.

The stitching then extends along the breast 21 and enters the body at 22 where it extends upwardly and emerges on the upper left hand side of the back at 23, thence extending along and reentering the body at 24. The cord is then carried thru the body and emerges from the breast at 25 so that when the stitching is pulled down tightly a curve or indentation 26 is provided in the body. The stitching next passes along the breast as seen in Fig. 3 to the point 28 where it reenters the body and extends upwardly to emerge from the side near the back on the left side at 29. The next stitch extends along the side and reenters the body at 30, emerging at 31 on the breast and reentering the body near the tail at 32, extending upwardly thru the body at 33 where it crosses the stitching 12 and reenters the body at 34 and passes downwardly to emerge from the breast on the opposite side of the center line of the back as at 35. The stitching continues along the right side of the back reentering the breast at 36, emerging from the back at 37, and reentering the back at 38, emerging from the breast at 39, reentering the base at 40 and emerging from the back at 41, and reentering the back at 42 to terminate by being anchored at 43 in the breast along the seam line 5. It seems obvious that the stitching can follow other patterns if desired so long as it serves to shape and reenforce the stuffing.

The cross piece at the tail between the points 33 and 34 tends to hold down the body and give the proper set to the tail of the decoy.

The stitching 15 gives the proper set to the base or breast in that it holds the breast, back, and the sides in a fixed relative position because the thickness of the body on an inclined plane downwardly and inwardly along the line of the stitching is definitely fixed.

The eyes 50 are positioned on opposite sides of the head and may be attached together by a cord or wire 51. In attaching the eyes the cord or wire 51 is drawn tightly so as to cause the eyes to fit snugly into the sides of the head and create a depression 52 which is a natural configuration of a bird head. This also creates a bulge at 53 near the base of the bill 11 and results in a very good likeness of a duck or other bird which is being simulated.

It is intended that the body after it is completed will be suitably water proofed by painting, spraying or dipping which adds to the firmness of the body.

Attention is directed to the fact that the entire side, head, neck and bill portion of the decoy are constructed of a single piece of fabric so that the fabric tends to hold the various portions together without any reinforcings and results in a very rigid construction which can be roughly handled without damage. The flat bottom of the decoy provides a very low center of gravity and particularly when the lighter material is used in the head, breast and top of the back, while the more rigid material is used in the base of the body.

It has been found that ducks constructed in accordance with the invention when actually used will not capsize even in very rough water, that the decoy settles in the water but a fraction of an inch and gives a very live looking appearance; in fact live ducks have intermingled for long periods of time with a flock of decoys and appeared entirely satisfied that they were live companions. In event the body is punctured it is sufficiently water proof and will not sink and the average decoy made in accordance with the invention has a weight of only six and one-half to eight and one-half ounces which makes it very satisfactory for transportation and causes it to float on the very top of the water.

What is claimed is:

1. A bird decoy composed of two like pieces of fabric having the bird shape in side elevation, stitching around the edges affixing the two pieces of fabric together, a stuffing for the base of the body including ground cork and shellac, a wooden bill inserted through the space and into the outline of the bill of the fabric, a cotton stuffing for the back, breast and head, eyes drawn together to provide a bulge of the head adjacent the base of the beak, and stitching extending from along the opposite sides of the back through the body and adjacent the center of the base of the body so as to pull in the sides of the back to shape the body and to hold the bottom substantially flat.

2. A decoy bird of the character described including two like pieces of fabric sewed together about the edge to provide a body, a stuffing within the body and head, and stitching along each side of the body extending through the fabric and stuffing from the top of the back to the base to shape the body, and additional stitching to join the base of the neck and the breast.

3. A decoy duck including a fabric covering, a light weight stuffing therein, stitching extending through the fabric and stuffing to shape the body with a substantially flat base, and to form indentations at each side of the back, said stitching extending across the front of the back, through to the breast, and from the sides to the breast and across the rear of the back to shape the back sides and tail.

4. A method of making decoys comprising coloring areas on a strip of cloth to as near a likeness as possible to the bird to be decoyed, cutting two complementary pieces from the cloth each of which consists of one half of the decoy covering and includes a head, neck, bill, body and tail portions all in one piece of cloth, sewing together the two pieces thus obtained at their edges except for a short space which remains open, inserting a rigid bill structure into the bill portion of the covering so that it fits firmly in place to fill the bill, stuffing the head and neck with a cotton or like material, mixing ground cork and a glutinous material and stuffing it while moist into the body of the fabric covering, sewing up the open space to confine the stuffing, shaping the decoy by applying pressure to conform the stuffing inside the covering while it is still moist to the shape of the bird desired, sewing with a thread thru the body of the decoy by passing the stitches thru the covering and stuffing from the top of the body along the back to the bottom or base, drawing the stitches firmly in place, affixing eyes to the head so as to create a bulge at the sides of the head, and allowing the stuffing to solidify while thus shaped by the stitching.

5. A method of making decoys comprising coloring areas on a strip of cloth to as near a likeness as possible to the bird to be decoyed, cutting two complementary pieces from the cloth each of which consists of one half of the decoy covering and includes a head, neck, bill, body and tail portions all in one piece of cloth, waterproofing the pieces to seal in the coloring and to preserve the stuffing when the decoy is completed, sewing together the two pieces thus obtained at their edges except for a short space which remains open, inserting a rigid bill structure into the bill portion of the covering so that it fits firmly in place to fill the bill, stuffing the head and neck with a cotton or like material, mixing ground cork and a glutinous material and stuffing it while moist into the body of the fabric covering, sewing up the open space to confine the stuffing, shaping the decoy by applying pressure to conform the stuffing inside the covering while it is still moist to the shape of the bird desired, sewing with a thread thru the body of the decoy by passing the stitches thru the covering and stuffing from the top of the body along the back to the bottom or base, drawing the stitches firmly in place, affixing eyes to the head so as to create a bulge at the sides of the head, and allowing the stuffing to solidify while thus shaped by the stitching.

6. In the art of making bird decoys the steps of printing on sheets of fabric a side elevation of the bird to be decoyed including the color configuration and arrangement, such side elevation being so shaped that the outline will constitute one half of the covering for the decoy, cutting the outlines from the fabric, connecting two complementary halves together, stuffing the covering thus formed with a plastic stuffing adapted to solidify, and stitching the back and breast together while the stuffing is plastic so that the stitching thereafter shapes the body and reenforces the stuffing to retain the decoy in a natural outline.

7. In a bird decoy made up of a fabric covering and a stuffing adapted to solidify, means to shape the body of the bird which comprises stitching passing thru the body from top to bottom and penetrating both the covering and the stuffing said stitching extending across the top of the body behind the neck, along each side of the body and across the body near the tail.

8. A bird decoy comprising two complementary printed pieces of fabric, such printing having been applied to the fabric prior to formulation of the decoy, sewing around the edges of the two pieces, to form a bill, head, neck and body having a back, breast and tail, a rigid bill portion inserted to fill the fabric bill, cotton filling to shape the head and neck, a cork and binder stuffing to fill the body, eyes affixed thru the head to each other to create a natural bulge at the sides of the head, and a stitching from the back to the breast from the neck to the tail extending thru the covering and cork stuffing to shape the body and reenforce the stuffing.

CHARLES L. ARMSTRONG.